INVENTOR.
NEIL J. RANNEY
BY Tilberry & Body
ATTORNEYS

Aug. 19, 1969   N. J. RANNEY   3,461,703
APPARATUS FOR UNCOILING AND PROCESSING METAL STRIP
Filed Oct. 30, 1964   10 Sheets-Sheet 5
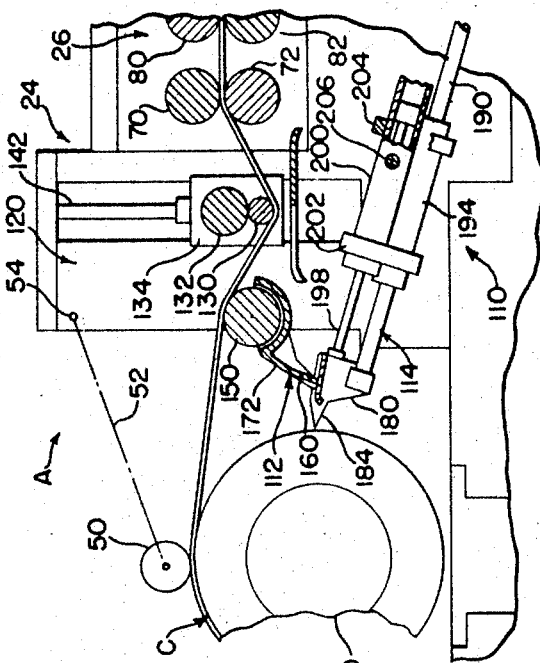
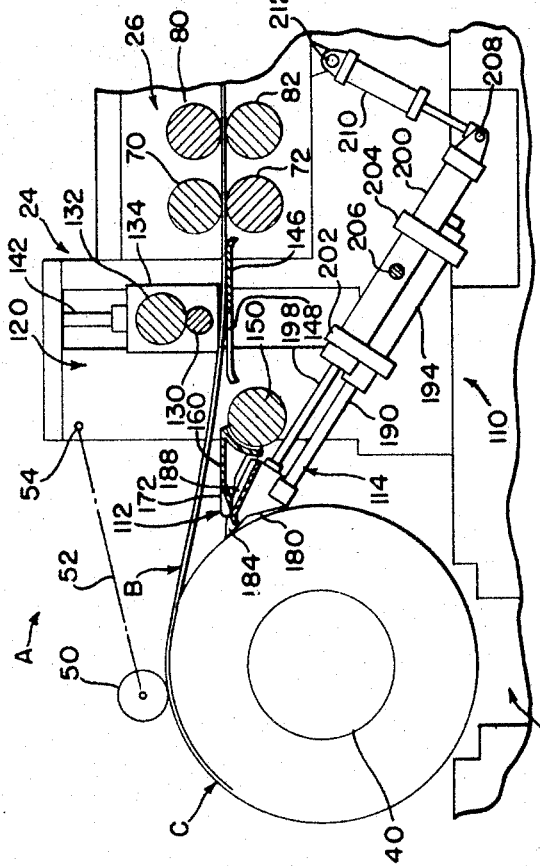
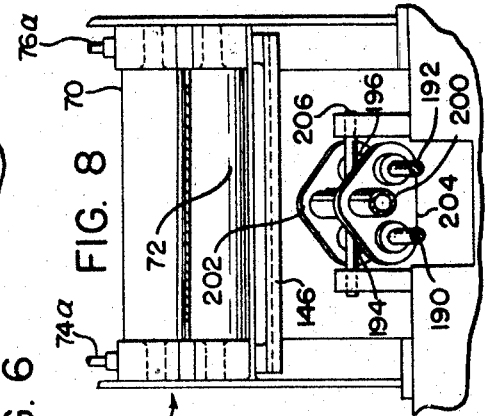
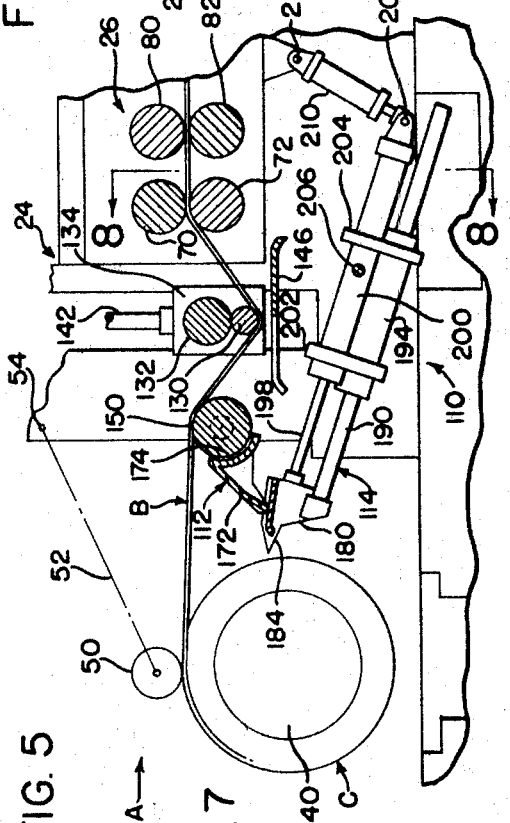
INVENTOR.
NEIL J. RANNEY
BY *Tilberry & Body*
ATTORNEYS

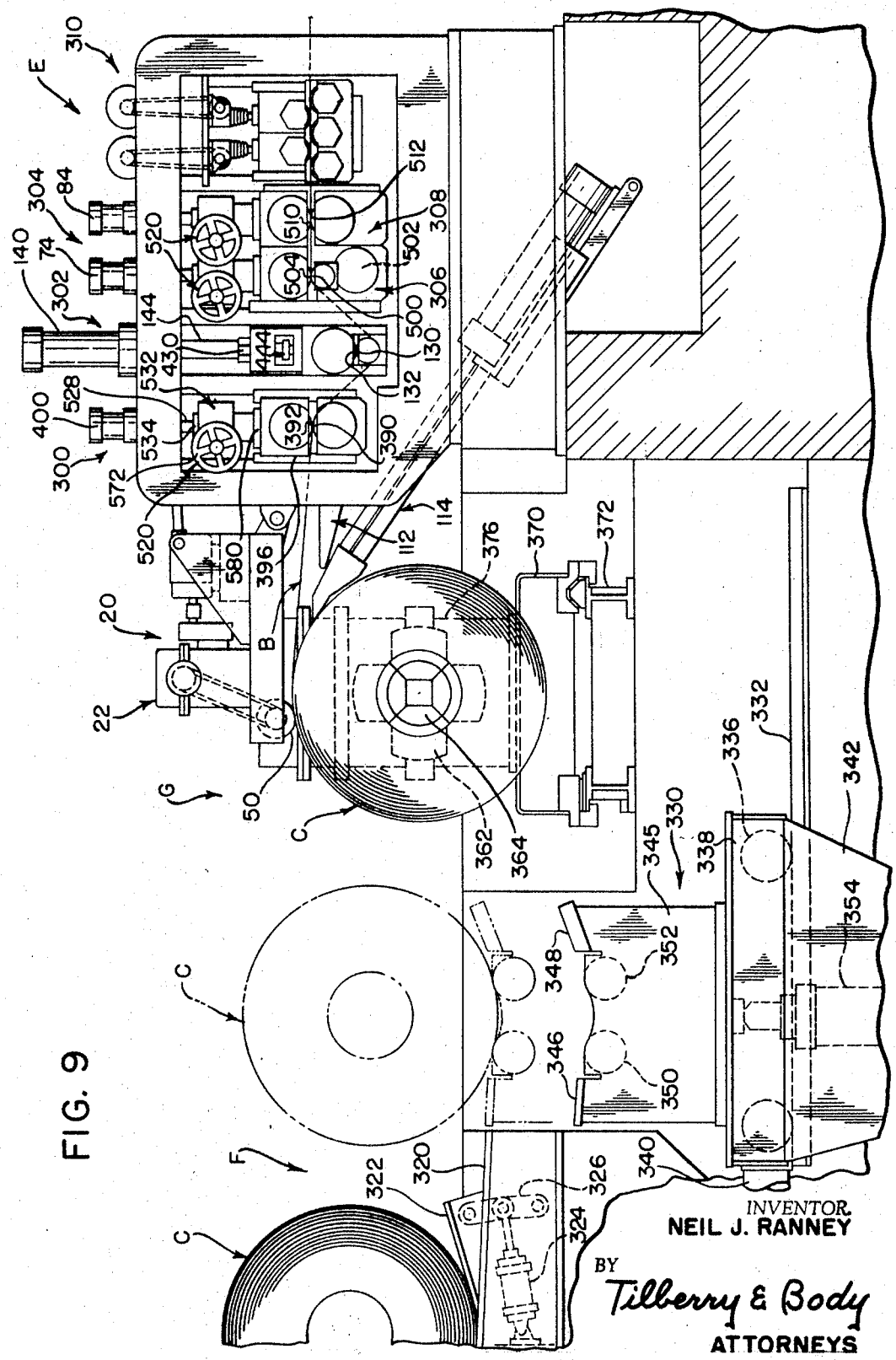

INVENTOR.
NEIL J. RANNEY
BY
Tilberry & Body
ATTORNEYS

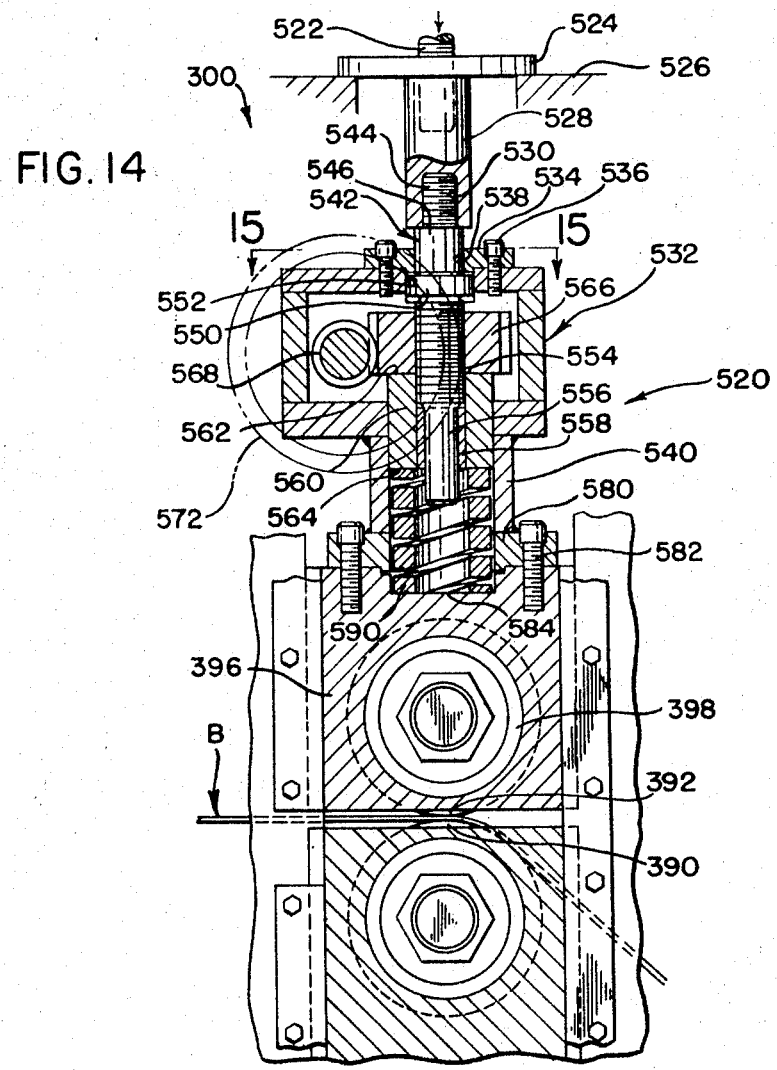
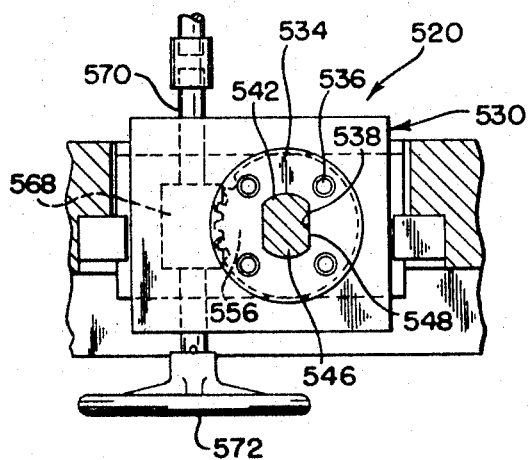

United States Patent Office 3,461,703
Patented Aug. 19, 1969

3,461,703
APPARATUS FOR UNCOILING AND
PROCESSING METAL STRIP
Neil J. Ranney, Mentor, Ohio, assignor to Production
Machinery Corporation, Mentor, Ohio, a corporation
of Ohio
Continuation-in-part of application Ser. No. 269,347,
Apr. 1, 1963. This application Oct. 30, 1964, Ser.
No. 407,673
Int. Cl. B21d *3/12;* B21c *47/16*
U.S. Cl. 72—183             28 Claims The present invention pertains to the art of metal strip processing and more particularly to an improved apparatus for uncoiling and processing a coil of metal strip.

This application is a continuation-in-part application of my copending application S.N. 269,347, filed Apr. 1, 1963, now abandoned.

The present invention is particularly applicable for use on a processing uncoiler of the type adapted to uncoil and straighten hot rolled, metal strip and it will be described with particular reference thereto; however, it is to be appreciated that the invention has somewhat broader applications and may be used in processing uncoilers adapted to uncoil and straighten various types of metal strip whether such strip is hot rolled or cold rolled.

After a metal strip is hot rolled, it is usually wound onto a coil for handling purposes. The strip must then be uncoiled and straightened before it can be introduced into a subsequent processing line. One of the principal difficulties encountered when the strip is uncoiled is the formation of transverse fissures in the strip, which are commonly called "coil breaks." These fissures result from severe reverse bends in the strip caused by the tendency of the strip to retain its curved or coiled shape as it is uncoiled. These coil breaks seriously limit further use of the strip.

Another difficulty is that the strip, as it is payed from the coil, assumes a generally wavy configuration which is not suitable for use in subsequent processing apparatus; therefore, the strip issuing from the coil must ordinarily be fully straightened before it is acceptable for further use.

In order to prevent the transverse fissures or coil breaks and the wavy configuration of a strip payed from a coil it has been proposed to apply, to the outer periphery of the coil, a small diameter working roll around which the strip was pulled as it left the coil. Such an arrangement mildly cold worked the strip uniformly along its length and prevented coil breaks; however, the degree of cold working was relatively fixed. Consequently, when the strip did not require a severe degree of cold working, for instance when the strip was to be used for a drawing operation, this type of processing uncoiler was not particularly successful.

In order to allow variation in the amount of strip cold working, it has been proposed to eliminate the working roll riding directly on the coil and to substitute therefor a working roll spaced from the coil and adjustable in a vertical direction. Such an apparatus provided a means for adjusting the amount of strip cold working; however, as the coil diameter decreased with removal of the strip, uniform cold working of the strip was obtained only by adjustment of the position of the spaced working roll. The adjustment could be automatically controlled; however, it required a complex apparatus which was difficult to maintain and quite expensive to install.

The permanent set of the convolutions of the coil, which is more pronounced when the strip is hot rolled, causes a further disadvantage, namely, the convolutions are held in place and resist being peeled from the coil. This makes it difficult to thread the leading end of the strip through the processing apparatus. According to conventional practices, a coil was opened and the free end of the outer wrap was flattened and straightened by reverse bending to facilitate threading into the entry end or pass of the apparatus. While various forms of apparatus have been proposed for this purpose, manual manipulation of the flattened or straightened end was usually required to thread it into the entry pass of the processing line. In addition, such forms of apparatus usually required special arrangements of coil handling devices and uncoilers at the processing line and were not adaptable to attachment with the existing line. Consequently, the mechanism for threading the leading end of the coiled strip from the coil into the straightened rolls of the apparatus have not heretofore been completely successful and easily incorporated within the existing processing uncoilers.

These and other disadvantages have been overcome by the present invention which is directed toward an improved apparatus for uncoiling and processing metal strip which apparatus is easily adjusted for providing the proper cold working of the strip, works the strip uniformly irrespective of the size of the coil and, conveniently, peels off the outer wrap of the coil and threads the end of the strip through the subsequent processing line without manual handling of the strip.

In accordance with the present invention, there is provided a processing uncoiler having a horizontal pass defined by a first working roll and a set of pinch rolls, a vertically adjustable second working roll between the first working roll and the pinch rolls and means for shifting the second roll from a strip threading position above or adjacent the horizontal pass to a working position substantially below the horizontal pass.

By this arrangement, the second working roll may be positioned a given amount below the horizontal pass so that the strip, which is threaded over the first roll, under the second roll and through the pinch roll, will be worked uniformly irrespective of the diameter of the coil from which the strip is issuing. Further, adjustment of the vertical position of the second working roll expeditiously changes the amount of cold working of the strip.

In accordance with another aspect of the present invention, there is provided an apparatus for feeding the leading end of a coil of metal strip into a processing line comprising, in combination with an uncoiler for supporting and rotating the coil, a peeler mounted generally between the coil and the processing line, means for moving the peeler into peeling position with the coil, a threading apron between the processing line and the coil and adapted to be moved between an active and an inactive position, and means connecting the peeler and the apron for moving the apron into active position as the peeler is moved into its peeling position.

In accordance with still a further aspect of the present invention, the threading apron as defined above extends radially outwardly from the first working roll and is pivotally mounted on the axis of this roll whereby the peeler can pivot the apron from an inactive position to an active position when the peeler assumes its peeling position.

In accordance with still a further aspect of the present inevntion, there is provided an apparatus of the type described above and having a first working roll, a second working roll and a set of pinch rolls, all of these rolls refining a sinous cold working pass for a strip being unreeled from a mandrel supported coil wherein the first working roll is the bottom roll of a set of pinch rolls so that the apparatus may work the strip after the trailing end leaves the mandrel and until the trailing end passes through the set of pinch rolls having the fisrt working roll as a part thereof.

In accordance with still a further aspect of the present invention, an apparatus of the type defined above is provided with a mechanism for skewing the intermediate or second working roll so that the working roll may track the strip as it passes through the apparatus and correct any tendency of the strip to walk transversely of the apparatus.

The primary object of the present invention is to provide a processing uncoiler which is economical, easy to operate, easy to install and durable in operation.

Another object of the present inevntion is to provide an apparatus for uncoiling and straightening a metal strip wrapped onto a coil, which apparatus uniformly cold works the strip irrespective of the diameter of the coil from which the strip is issuing and without complicated continuous adjusting mechanisms therefor.

Yet another object of the present invention is the provision of an apparatus for uncoiling and straightening a metal strip wrapped onto a coil, which apparatus comprises a horizontal pass defined by a first working roll and the nip of a set of pinch rolls, a vertically adjustable second working roll between the first working roll and the pinch rolls and means for shifting the second working roll from an upward strip threading position above or adjacent the horizontal pass to a lower working position substantially below the horizontal pass.

These and other objects and advantages will become apparent from the following description used to illustrate the preferred embodiment of the invention as read in connection with the accompanying drawings in which:

FIGURES 5–7 are operational, somewhat schematic, views illustrating the various positions of the preferred embodiment of the present invention as is illustrated in FIGURE 4;

FIGURE 8 is an elevational, somewhat schematic, view taken generally along line 8—8 of FIGURE 7;

FIGURE 9 is a side elevational view illustrating a modification of the preferred embodiment as shown in FIGURES 1–8;

FIGURE 14 is a partial, enlarged view showing another aspect of the present invention; and, FIGURE 15 is a partial cross-sectional view taken generally along line 15—15 of FIGURE 14.

Figure 1:
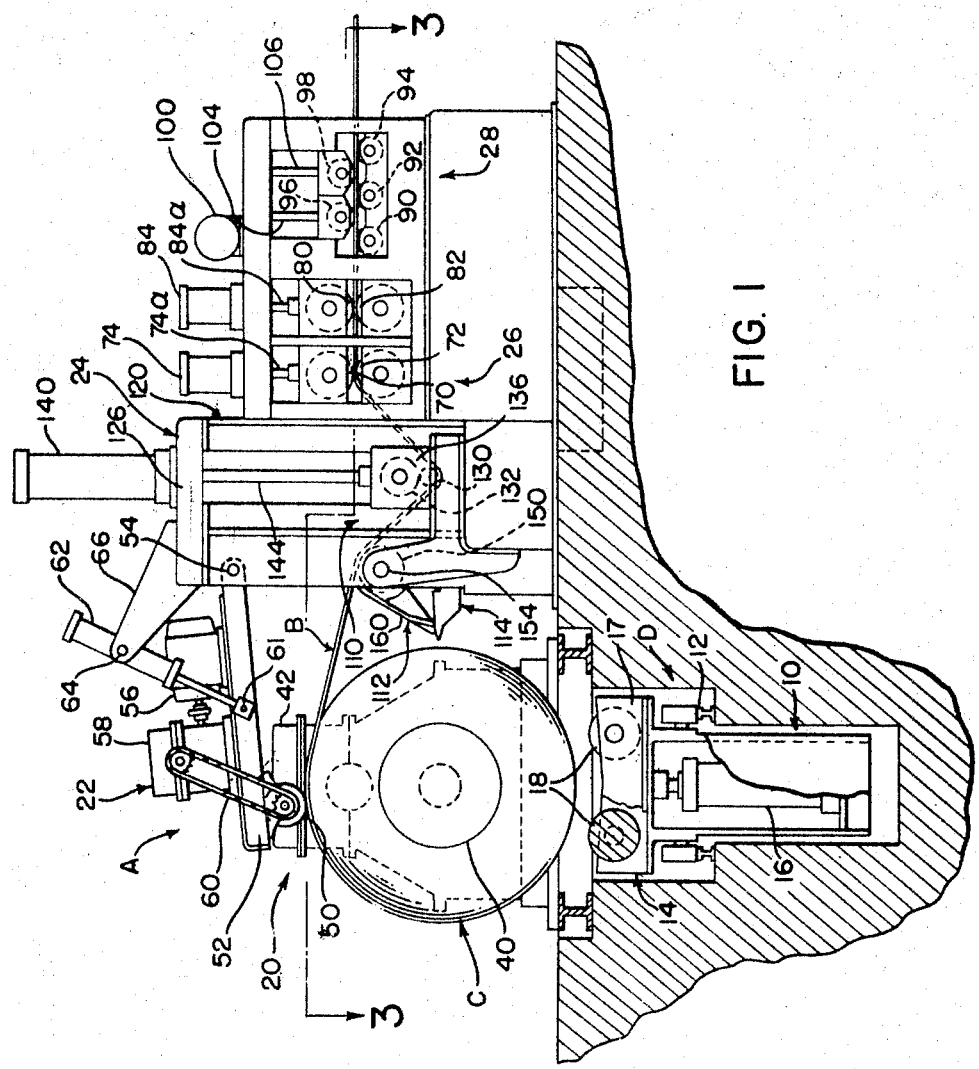
FIGURE 1 is a side elevational view illustrating the preferred embodiment of the present invention.
Figure 2:
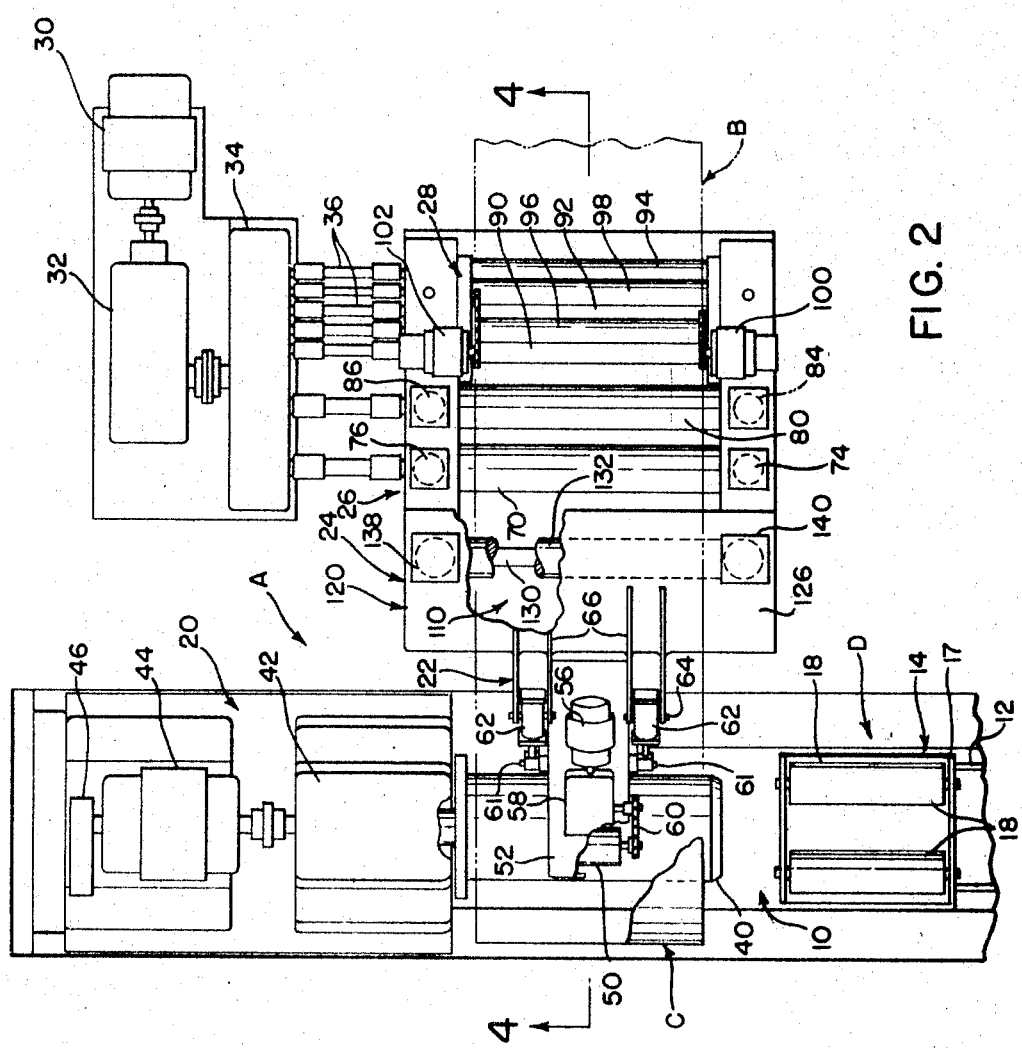
FIGURE 2 is a top, somewhat fragmentary, plan view illustrating the preferred embodiment of the present invention.

Referring now to the drawings, wherein the showings are for the purpose of illustrating preferred embodiments of the invention only, and not for the purpose of limiting same, FIGURES 1 and 2 show a first embodiment of the invention comprising an apparatus A for uncoiling and processing a metal strip B issuing from a strip coil C so that the strip is in condition for subsequent use in a processing line adjacent the exit end of the apparatus A. Especially when the strip B is a hot rolled, steel strip, the strip has a permanent set determined by the diameter of the coil and the temperature of the strip at the time it was coiled thereon. Apparatus of the class to which apparatus A is directed are known as processing uncoilers and they are adapted to remove this permanent set without causing transverse faults or coil breaks in the strip B so that the strip is generally flat for use in subsequent processing apparatus.

In accordance with the illustrated embodiment of the present invention, as shown in FIGURES 1–8, there is an outboard buggy D which transfers coil C into the uncoiling and processing apparatus. More specifically, the buggy D extends transversely from apparatus A and comprises a submerged pit 10 having a ledge for supporting rails 12 that reciprocally mount a dolly 14 so that the dolly may be moved toward and away from the apparatus A. To impart reciprocal movement to the dolly 14, there is provided, in accordance with the illustrated embodiment of the present invention, shown in FIGURES 1–8, a jack lift 16 secured onto an upper frame 17 of the dolly which upper frame includes rotatably mounted support rolls 18.

From the above description, it is apparent that the dolly 14 is adapted to move both transversely and vertically with respect to the apparatus A. By this compound movement arrangement of the dolly 14, a coil C may be transferred from a remote position transverse to the apparatus A to the apparatus and then lifted into engagement with the apparatus in a manner to be hereinafter descirbed in detail.

Referring now more specifically to the apparatus A, the apparatus includes generally a tension control mechanism 20, which in some cases may also be utilized for driving the coil while the strip is being threaded into the apparatus, a coil drive mechanism 22, a working stand 24, a tandem pinch roll assembly 26 and a five roll leveler 28. To better appreciate the present invention, each of these basic components of apparatus A will be discussed separately; however, it must be appreciated that various structural changes may be made in some of the components since they do not form essential elements of the present invention.

The apparatus A is powered primarily by the tandem pinch roll assembly 26 and the five roll leveler 28 and torque is transmitted to these components by a motor 30, of appropriate power rating, coupled onto transmission 32 which drives a power distributor 34 connected onto plural drive shafts 36. This particular arrangement for driving the apparatus A is common in the art of processing steel sheet and does not form a primary part of the present invention. Accordingly, various other drive arrangements could be utilized without departing from the intended spirit and scope of the invention.

While the strip B is being processed by apparatus A, it is necessary that a certain amount of tension be maintained on the strip so that the strip is properly worked during the processing operation. To accomplish this, in accordance with the illustrated embodiment of the present invention, as shown in FIGURES 1–8, there is provided a tension controlling mechanism 20, which not only creates tension in the strip, but also, supports the coil C. This mechanism 20 includes a mandrel 40 supported in cantilever fashion onto an appropriate framework and having a plurality of radially movable elements 40a which move outwardly to expand the diameter of the mandrel so that the mandrel can support the coil C in a manner common in the art of steel processing. The mandrel is supported in a horizontal direction by the combined journal and transmission 42 which is drivingly connected to a drag generator 44. In accordance with known practices, the drag generator can exert a predetermined drag on the rotation of mandrel 40 which drag is transferred to the strip B passing through the apparatus. Although the generator 44 can also operate as a motor by appropriate control thereof so that the coil C may be driven, in accordance with the illustrated embodiment of the present invention, the generator 44 acts primarily as a drag creating device. To hold the mandrel stationary in any predetermined position, the rearwardly extending rotor shaft of generator 44 is coupled with a magnetic brake 46 which brake, when actuated, locks the mandrel from rotation.

In accordance with the embodiment of the present invention, shown in FIGURES 1–8, the coil C may be driven after it is mounted on mandrel 40 by the coil drive mechanism 22 which comprises essentially a driven roll 50 adapted to contact the outer convolution of the coil and mounted on a frame 52 which is freely oscillated about journal 54 on the stand 24. Since a large coil of hot rolled steel has a considerable weight, a substantial amount of torque must be exerted on the coil by the roll 50 to overcome the inertia of the coil; therefore, in accordance with this embodiment of the present invention, the roll 50 is provided with an appropriate friction surface, such as knurling which has proven satisfactory in practice. Although a variety of driving arrangements could be utilized for driving roll 50, in accordance with this illustrated embodiment of the invention, the roll is driven by a motor 56 through a transmission 58 and a chain drive 60.

Oscillation of the frame 52 is accomplished by identical mechanisms on either side of the frame each of which mechanisms includes a hydraulic cylinder 62 having a pivoted journal 61 on frame 52 and a trunnion 64 adapted to pivotally couple the hydraulic cylinder with a bracket 66 welded or otherwise secured onto the stand 24. By appropriate control means, the cylinders 62 can pivot roll 50 into engagement with coil C and exert, between the roll and the coil, a considerable force so that the roll will not slip over the surface of the coil. The weight of frame 52 can assist in holding the roll 50 in driving engagement with the coil.

It is appreciated, that after the coil C is positioned onto mandrel 40, it can be driven by roll 50 so that the outer convolution or wrap of the coil can be threaded through the stand 24, assembly 26 and leveler 28 in that order.

Referring now to the tandem pinch roll assembly 26, there is included in this assembly a first pair of pinch rolls 70, 72 wherein roll 70 is vertically adjustable by cylinders 74, 76 through appropriate rods 74a, 76a positioned on either end of roll 70. Also included in the assembly 26 is a second set of pinch rolls 80, 82 wherein the roll 80 is vertically adjustable by cylinders 84, 86 through appropriate connecting rods 84a, 86a, respectively.

Adjacent the exit end of assembly 26 there is provided the conventional five roll leveler 28 including bottom driven rolls 90, 92 and 94 and upper driven rolls 96, 98 nested between the bottom rolls and vertically adjustable by appropriate means such as two adjusting motors 100, 102 positioned above the upper rolls and connected thereto by rods 104, 106.

As strip B passes through the pinch roll assembly and the leveler, the usual working of the strip is accomplished in a manner well known in the steel processing art and the strip issuing from the leveler 28 is substantially level and flat so that it may be conveyed to a subsequent processing line in the flattened condition. Accordingly, the strip will not damage the subsequent apparatus and the strip is free from transversely extending coil breaks.

The working stand 24 which is positioned between the entrant end or nip of the pinch roll assembly 26 and the mandrel 40 is essentially comprised of a strip processing mechanism 110, a threading apron assembly 112 and a peeler mechanism 114 each of which forms an important aspect of the present invention and will be described separately in detail.

Figure 3:
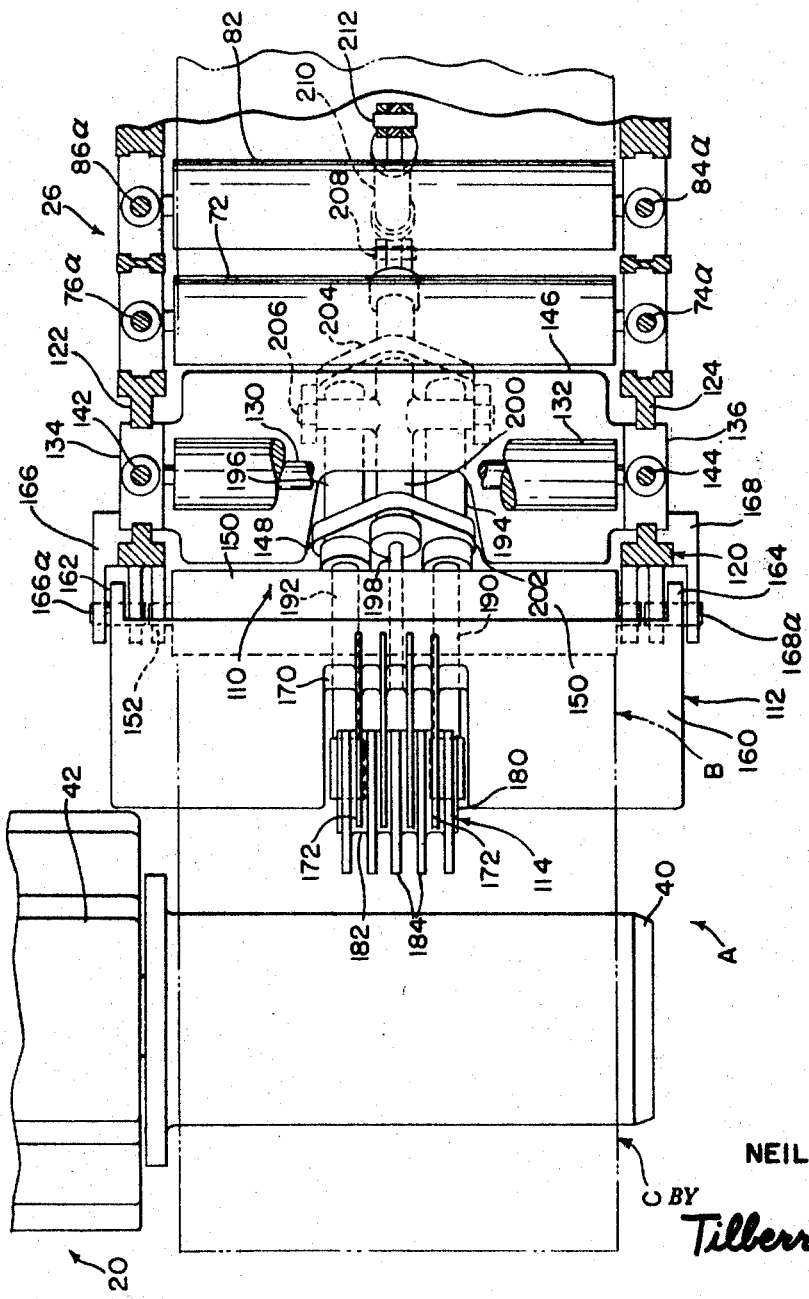
FIGURE 3 is a top, somewhat fragmentry, plan view taken generally along line 3—3 of FIGURE 1.

The strip processing mechanism 110 includes a generally, vertical frame 120 having upstanding sides 122, 124 as is best shown in FIGURE 3 and which are joined at their upper ends by a plate 126.

Extending generally between the sides 122, 124 is a small diameter working roll 130 backed up by a larger roll 132. The diameter of these two rolls is selected to impart the necessary cold working to the strip B as it passes through the strip processing mechanism 110. Adjacent the ends of rolls 130, 132 there are provided guide blocks 134, 136 which rotatably mount the rolls and have sliding engagement with the upstanding sides 122, 124.

To reciprocally mount the guide blocks, and thus the rolls 130, 132, there are provided two transversely spaced cylinders 138, 140 securely affixed to plate 126 and having downwardly extending reciprocal rods 142, 144 connected onto guide blocks 134, 136 respectively. Adjacent the lower end of the guide blocks 134, 136 and spaced from the working roll 130 there is provided a transversely extending shelf 146 having a generally central recess 148 facing toward the coil C.

In accordance with the invention, as so far described, the cylinders 138, 140 can be appropriately actuated to reciprocate rolls 130, 132 in a vertical direction which in turn causes the shelf 146 to reciprocate in a like manner. Still further, there is provided means for locking the rolls 130, 132 in various positions with respect to the nip of the pinch rolls 70, 72. Accordingly, the working roll 130 can be moved between an upper position wherein shelf 146 is generally aligned with the nip of the pinch rolls for threading the strip B through the apparatus A and a lower position wherein roll 130 is positioned substantially below the nip of the pinch rolls for working strip B.

The strip processing mechanism 110 also includes a first or initial working roll 150 which, in accordance with this embodiment of the present invention, has a larger diameter than working roll 130. This roll is positioned between the coil C and the nip of pinch rolls 70, 72, with the upper surface of the roll being substantially aligned with the nip of the pinch rolls to define a horizontal pass. The roll 130 may be adjusted in a vertical direction with respect to this horizontal pass to define the working angle of strip B.

The strip B is threaded over the first working roll 150 under working roll 130 and into the pinch roll assembly 26. The amount of working of strip B is determined by the position of the roll 130 with respect to the horizontal pass between the pinch rolls and the initial working roll 150; therefore, since this position is fixed, the working of strip B remains constant irrespective of the reduction in diameter of coil C as it is being uncoiled. This feature is seen in FIGURES 6 and 7 wherein the working angle, which is defined by this position of roll 130, is constant as the coil decreases in diameter. By this arrangement, constant working of the strip B is possible without requiring a complicated device for adjusting the position of roll 130 as the coil decreases in diameter. Further, it is possible to provide a minimum amount of working by adjusting the roll 130 in an upward direction. This is not the situation when one working roll is in contact with the outer convolution of the coil.

Figure 4:
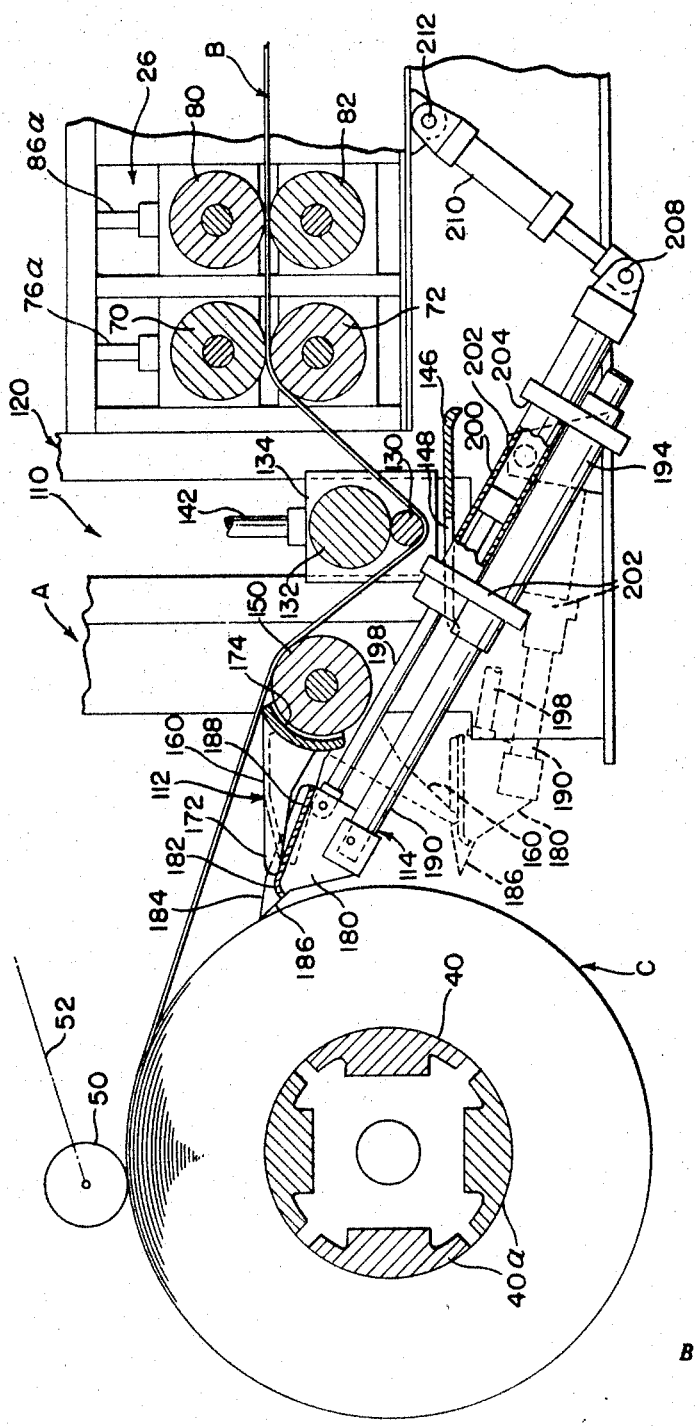
FIGURE 4 is a side, somewhat fragmentary, elevational view taken generally along line 4—4 of FIGURE 2.

The threading apron assembly 112 as shown in FIGURES 3 and 4, includes essentially an apron 160 having a generally flat upper surface and transversely spaced mounting lugs 162, 164. To pivotally secure the apron onto frame 120, The frame is provided with bifurcated brackets 166, 168 which support the lugs 162, 164 by appropriate pivot pins 166a, 168a. The forwardmost or entrant end of apron 160 is provided with a transversely centralized recess 170 having a plurality of forwardly extending cam fingers 172, the function of which will be explained hereinafter in detail. Since the pins 166a, 168a pivot apron 160 coaxially with respect to the initial or first working roll 150, the apron is provided with a rearward contoured surface 174 that matches the outer surface of the working roll 150 and allows the apron to freely pivot about the roll without interference therewith.

By so constructing the apron assembly 112, it operates in unison with the working roll 150 to provide a processing element combination which is first used to thread the sheet B through the processing apparatus and, thereafter, used for processing the strip. This reduces considerably the space required for the threading apron and allows accurate alignment of the apron with respect to the working roll irrespective to its angular disposition therewith.

Referring again to FIGURE 4, the apron 160 can be conveniently pivoted from a downward or inactive position shown in phantom lines where it does not come in contact with strip B to an upper active or threading position where the apron can easily be used to thread strip B over working roll 150, under the raised working roll 130 and into the nip of pinch rolls 70, 72. In other words, the apron 160 can be conveniently shifted from an inactive position to a threading position without requiring complicated mechanisms for assuring alignment of the apron with respect to the horizontal pass of the apparatus. The mechanism for shifting the apron 160 will be hereinafter described in detail.

An important aspect of the present invention is the provision of the peeler mechanism 114 positioned between the initial working roll 150 and the coil C which peeler mechanism is utilized for contacting and peeling away the outer convolution or wrap of the coil and, further, shifting the apron 160 from the inactive position to the active or threading position. The working portion of peeler mechanism 114 is the head 180 best shown in FIGURES 3 and 4 which head comrises a transversely extending cam plate 182 adapted to contact the cam fingers 172 so that upward movement of the head 180 will cause upward movement of the apron 160. Adapted to extend upwardly between the fingers 172 there is provided on head 180 a plurality of peeling fingers 184 each having a knife edge 186 and a back surface 188 which back surface extends below fingers 172 adjacent the front or entrant end of the apron 160. Accordingly, when the head 180 is moved upwardly the cam plate 182 contacts the fingers 172 so that the apron is moved upwardly and so that the back surface 188 and the apron 160 form a continuous surface leading toward the horizontal pass of apparatus A.

Compound movement of head 180 with respect to the coil and the apron 160 may be accomplished by a variety of structural embodiments; however, in accordance with this embodiment of the present invention, the head 180 is supported by transversely spaced guide rods 190, 192 reciprocally received within parallel tubular guides 194, 196. To slide the head 180 longitudinally with respect to guides 194, 196 there is provided an actuating rod 198 driven by hydraulic cylinder 200. Cylinder 200 and tubular guides 194, 196 are coupled as a unit by supports 202, 204 which unit is pivotally mounted by trunnions 206 shown in FIGURE 8. As so far described, the head 180 can be moved longitudinally with respect to the tubular guides 194, 196 by actuation of cylinder 200. To impart radially outward movement of head 180 with respect to coil C there is provided a pivotal connection 208 joining a cylinder 210 onto the unit comprising the guides 194, 196 and cylinder 200. By pivotally connecting the cylinder 210 to the apparatus A at pivot connection 212, operation of cylinder 210 pivots the head 180 about trunnions 206. By this arrangement, compound movement of the head 180 with respect to the coil C and the threading apron assembly 112 is easily accomplished. Also, the head 180 contacts the fingers 172 as it moves toward its peeling position in contact with the outer convolution of coil C. This shifts the apron 160 from its inactive position to the upper threading position. The recess 148 on shelf 146 allows free movement of the peeler mechanism while the working roll 130 is in its downwardmost working position.

Referring now to FIGURES 5-7, there is illustrated the basic features of apparatus A constructed in accordance with the present invention. Referring specifically to FIGURE 5, the coil C is positioned onto mandrel 40 and the driven roll 50 is pivoted down against the coil so that the coil can be driven thereby. Through actuation of cylinders 200 and 210 the peeler head 180 can be moved into engagement with the outer convolution of coil C so that the knife edges 186 are susbtantially tangential to the outer convolution of coil C. The movement of head 180 into the peeling position with respect to coil C shifts the apron 160 into the upper threading position shown in FIGURE 5. As the strip B is peeled from the coil C it slides over the back surface 188 and across the apron 160 which directs the strip over the initial or first working roll 150. Prior to the peeling operation the working roll 130 has been moved into the upper threading position so that the shelf 146 is substantially aligned with the horizontal pass of apparatus A defined by the working roll 150 and the nip of pinch rolls 70, 72; accordingly, the strip B rides over the shelf 146 and into the driven pinch roll assembly 26 which directs the strip into the leveler 28 and on through the apparatus A. As soon as the strip is being pulled from coil C, the driven roll 50 becomes inactive since there is provided an overriding clutch so that force cannot be transmitted from the coil C back to the roll. The driven roll 50 may remain in contact with coil C to better control the uncoiling operation; however, it is possible to withdraw the driven roll after the strip is threaded through the apparatus A by cylinder 62.

Referring now more specifically to FIGURE 6, after the peeler has directed strip B through the apparatus and the apparatus has commenced its operation, the cylinders 200, 210 are actuated to retract the peeler head 180 which allows apron 160 to shift downwardly into an inactive position as it pivots around the axis of working roll 150. This leaves the upper surface of working roll 150 exposed so that the strip B passes thereover. At this time, the working roll 130 is moved into a downward position substantially below the horizontal pass of the apparatus so that the strip coming from roll 150 is driven under roll 130 and into the horizontal pass at the nip of the pinch rolls 70, 72 which nip may be referred to as the entry pass of the apparatus. Downward movement of the working roll 130 shifts the threading shelf 146 into a downwardly inactive position below the working roll 130. Consequently, the strip B is processed by the initial roll 150, working roll 130, pinch roll assembly 26 and leveler 28 so that the strip issues from the apparatus A in a substantially flat condition without transversely extending coil breaks.

Referring now to FIGURE 7, as the coil C decreases in diameter during the operation of apparatus A, the working angle between roll 150, roll 130 and the pinch rolls 70, 72 remains constant and is defined only by the amount of downward displacement of the working roll 130 with respect to the horizontal pass of the apparatus. Accordingly, a slight amount or a great amount of working can be imparted to strip B and this working can remain constant during the whole uncoiling operation without continuously shifting the position of the working roll 130. This is a substantial improvement over the complex apparatus heretofore suggested for uncoiling and processing hot rolled steel strips.

A modification of the present invention is shown in FIGURES 9-13 wherein apparatus E is utilized to remove strip B from coil C for the purpose of first uncoiling the strip, second, cold working the strip a predetermined amount and third, leveling the strip so that it may be directed to a subsequent processing apparatus in a substantially flat condition. The apparatus E is somewhat similar to the apparatus A as shown in FIGURES 1-8 and in some instances the features of apparatus E are substantially identical to the like features of apparatus A. For instance, the tension control 20 with the coil drive mechanism 22 of apparatus A is incorporated without substantial change in apparatus E. Also, the threading apron assembly 112 and the peeler mechanism 114 of apparatus A are incorporated within the apparatus E with very slight modifications. Consequently, these particular features of apparatus E will not be hereinafter described in detail. The apparatus E differs in certain structural aspects from apparatus A; therefore, the complete apparatus E will be hereinafter described in detail to illustrate the differences between apparatus E and apparatus A.

Figure 10:
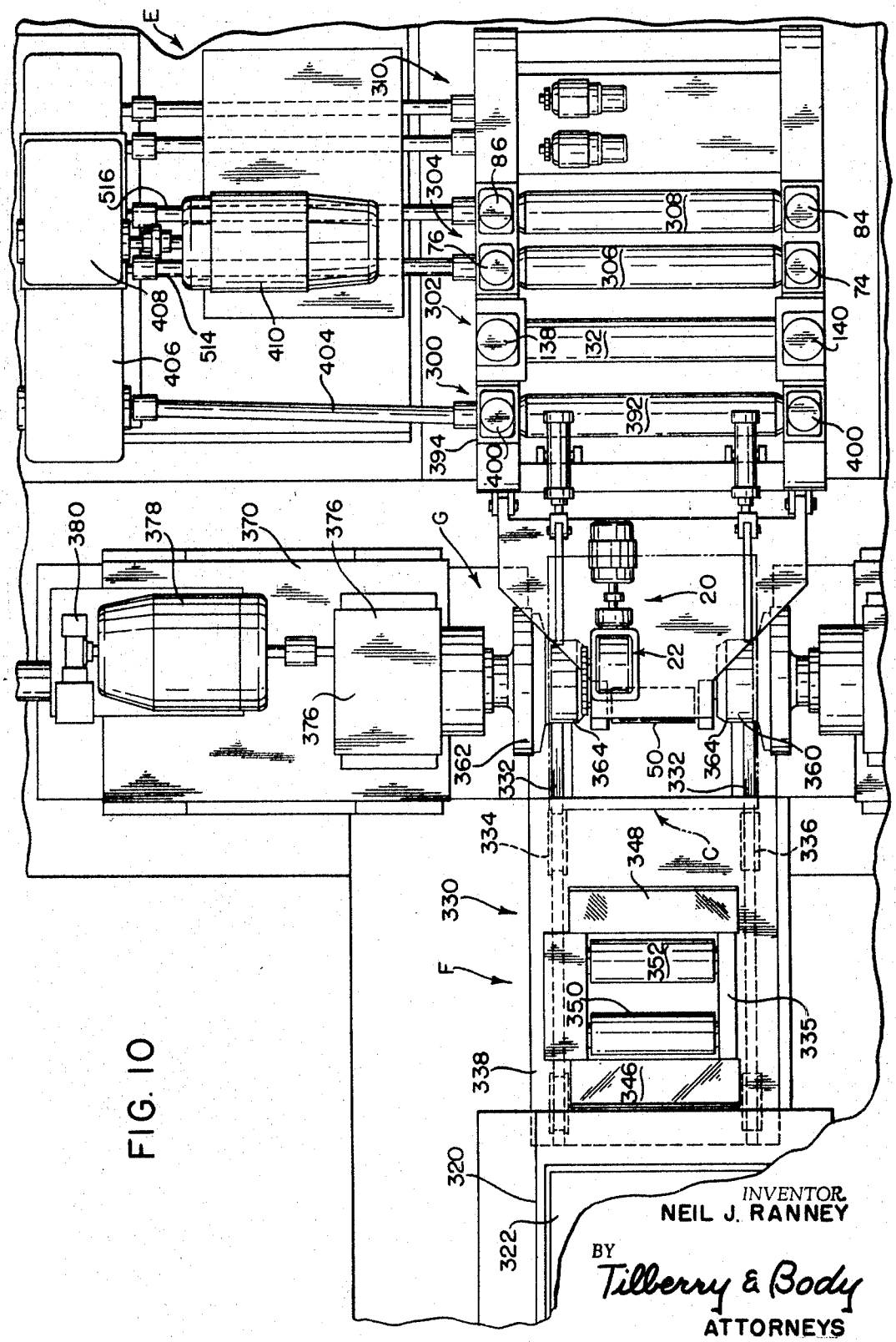
FIGURE 10 is a top, plan view illustrating the modification of the present invention as shown in FIGURE 9.
Figure 11:
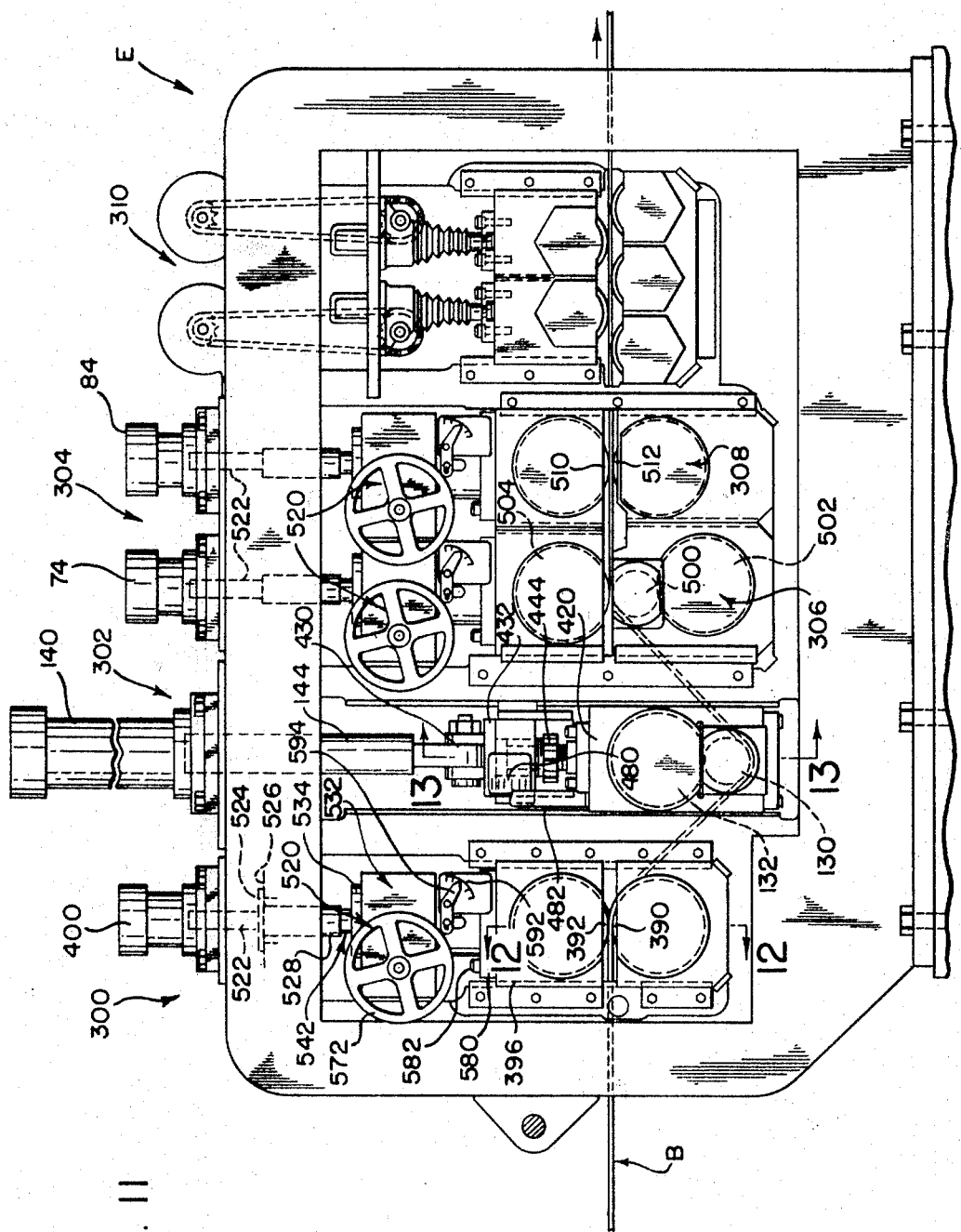
FIGURE 11 is an enlarged, partial side elevational view showing, in more detail, the modifications of the present invention as shown in FIGURES 9 and 10.

The apparatus E, as best shown in FIGURES 9–11, includes coil loading mechanism F, mandrel or coil supporting mechanism G, first working station 300, second working station 302, third working station 304—including dual pinch roll sets 306, 308—and a five roll leveler 310. These components correspond substantially to similar mechanisms in apparatus A; however, there are certain structural features distinguishing these elements of apparatus E from the corresponding elements of apparatus A.

Referring now more particularly to the coil loading mechanism F, this mechanism is positioned in horizontal alignment with apparatus E to feed coil C longitudinally toward the apparatus. The coil loading mechanism includes an inclined support frame 320 adapted to receive coils C from an appropriate conveyor, not shown, and a pivotally mounted escapement plate 322 actuated by a cylinder 324 connected onto toggle 326. Actuation of cylinder 324 moves the escapement plate downwardly to allow movement of coil C along frame 320 to a loading buggy 330.

The loading buggy includes lower rails 332 extending toward apparatus E, flanged wheels 334 and non-flanged wheels 336 secured onto base 338 for locating the base reciprocally on the rails 332. Rearward of the base 338 there is provided a fluid cylinder 340 which reciprocates base 338 on rails 332 in response to fluid pressure within the cylinder. Beneath the base 338 there is provided a lower frame 342 and above the base there is provided an upper vertically movable frame 345. The movable frame includes longitudinally spaced inclined locator plates 346, 348 and locator rolls 350, 352. A fluid operated cylinder 354 secured with respect to the lower frame 342 is adapted to be actuated for controlled reciprocal movement of the upper frame 345.

Loading buggy 330 receives a coil C upon actuation of escapement plate 322. Thereafter, the cylinder 354 is actuated so that the coil C is vertically positioned with respect to apparatus E. The vertical location of coil C will change in accordance with the diameter of the coil so the upper frame 345 must be moved to different vertical positions to properly align different diameter coils with the apparatus E. In accordance with normal practice, an electric eye or photo cell mechanism provides a beam of light which is directed axially with respect to the coil C. As cylinder 354 is actuated to move the coil upwardly, the coil progresses upwardly until the beam of light extends through the central opening of the coil. At that time, the operation of cylinder 354 is stopped and the coil C is in the proper vertical position for longitudinal movement toward the apparatus E. Of course, other aligning mechanisms may be used without departing from the intended spirit and scope of the present invention. Thereafter, cylinder 340 moves the base 338, and thus coil C, toward the apparatus E.

The mandrel or coil supporting mechanism G is positioned between the coil loading mechanism F and the first working station 300 of apparatus E. This coil supporting mechanism includes transversely movable heads 360, 362, each of which includes an expanding mandrel 364. The head 362 is supported on a movable frame 370 which is slidably received upon a relatively fixed support frame 372, best shown in FIGURE 9. The movable frame 370 includes a gear box 376 drivingly connected onto head 362 and onto a drag generator 378, similar to drag generator 44 of apparatus A. Behind the generator there is provided a magnetic brake 380 similar in operation to the magnetic brake 46 of apparatus A. Upon movement of coil C between heads 360, 362 by buggy 330 the heads 360, 362 engage opposite sides of coil C. Then, the expanding mandrels 364 are actuated to firmly grip the coil C. Thereafter, the tension control 20 with coil drive mechanism 22 is pivoted downwardly until the drive roll 50 drivingly engages the outer convolution of the coil C. Peeler mechanism 114 is then moved toward the coil to operate threading apron assembly 112, in a manner previously described in detail in connection with the apparatus A. In this manner, the drive roll 50 can thread the outer convolution of coil C toward the first working station 300 of apparatus E.

Figure 12:
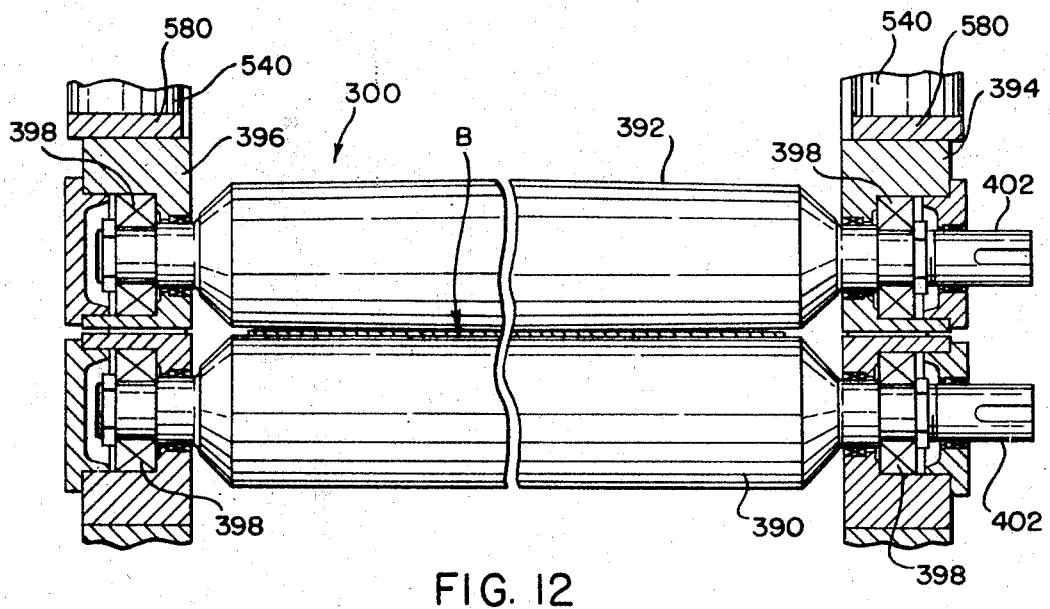
FIGURE 12 is an enlarged cross-sectional view taken generally along line 12—12 of FIGURE 11.

Referring now to the first working station 300, of apparatus E, this station includes a set of driven pinch rolls having a lower working roll 390 and an upper pressure roll 392, see FIGURE 12. This feature differs from apparatus A wherein the first working roll 150 is an idler roll instead of a driven set of pinch rolls. Referring now more particularly to the structure shown in FIGURE 12, the pinch rolls of the first working station 300 includes transversely spaced frames 394, 396 having bearings 398 for rotatably mounting the pinch rolls with respect to the frames. Pressure is exerted on the upper roll 392 by two transversely spaced power cylinders 400, shown in FIGURE 10. Each roll 390, 392 is provided with an outwardly extending stub shaft 402 drivingly connected onto a drive shaft 404, only one of which is shown, see FIGURE 10. These drive shafts 404 are in turn connected to the output of gear box 406 which is driven by a gear reducer 408 connected onto the output of motor 410.

By providing the driven pinch rolls at the first working station 300, the pinch rolls can engage the initial end of strip B as it issues from the coil C. The driven rolls 390, 392 can then forceably thread the strip through the remainder of the apparatus E. In this manner, it is not necessary to thread the strip solely by the drive roll 50. A more important aspect of the driven pinch rolls at station 300 of apparatus E is that tension may be applied to the strip B until the trailing end actually passes through the first working station 300. This is distinguished from apparatus A wherein the back tension on the strip must be maintained by the drag generator 44. By that construction, the last few convolutions issuing from the coil C do not have sufficient tension to provide the necessary working of the strip B. By providing the pinch rolls at station 300, the rolls are driven at a speed which places a back tension on the strip B until the strip leaves station 300; therefore, the strip is cold worked by roll 130 until the trailing end actually leaves the first working station 300. This is an advance of apparatus E over apparatus A.

Figure 13:
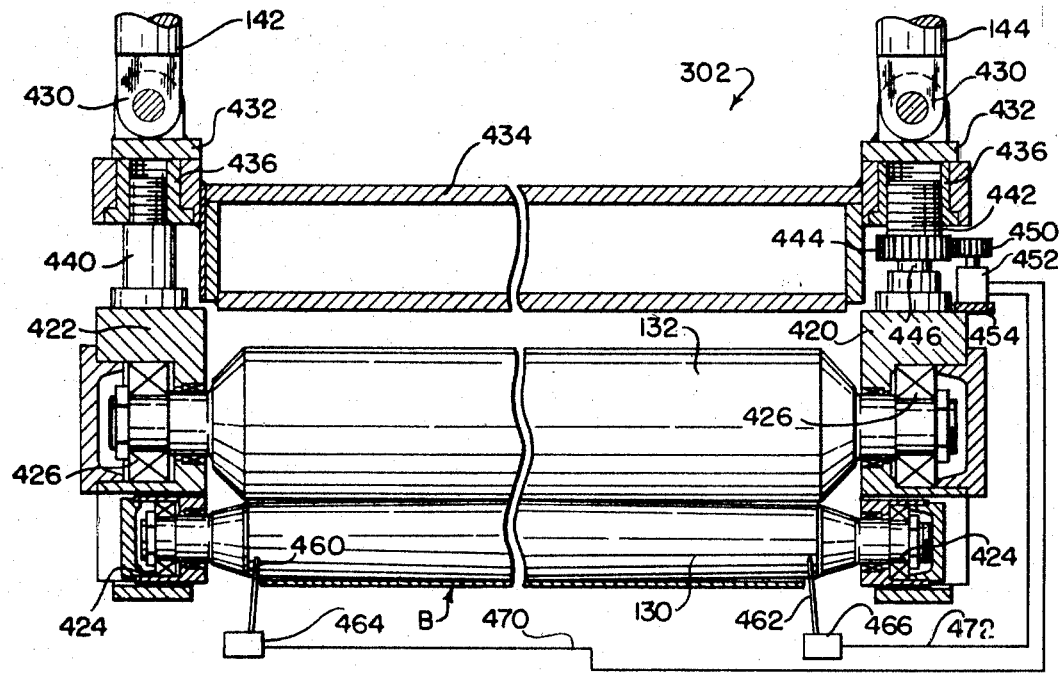
FIGURE 13 is an enlarged cross-sectional view taken generally along line 13—13 of FIGURE 11.

Referring now to the second working station 302, this station includes the smaller diameter working roll 130 backed up by a larger diameter roll 132, as is best shown in FIGURE 13. Transversely spaced cylinders 138, 140 move the rolls 130, 132 in a vertical direction by downwardly extending rods 142, 144. As so far explained, working station 302 does not differ substantially from working stand 24 as shown in FIGURES 1–8. It has been found that the strip B often has camber and other irregularities which will cause the strip to walk transversely along the surface of the rolls in the apparatus. To overcome this difficulty, apparatus E is provided with a mechanism which compensates for the transverse walking of the strip. Consequently, the strip remains substantially centered with respect to the apparatus E during the complete processing of the strip.

In accordance with this aspect of the invention, the rolls 130, 132 are supported within lower, transversely spaced frames 420, 422 by small diameter bearings 424 and large diameter bearings 426. The lower frames 420, 422 are relatively fixed with respect to the rolls 130, 132 so that the disposition of the rolls is determined by the position of these frames. At the lower ends of rods 142, 144 there are provided clevis connections 430 for supporting the upper frames 432 with respect to the lower portion of these rods. These clevis connections allow pivoting of upper frames 432 for a purpose to be hereinafter described in detail. The frames 432 are connected by a cross brace 434 so that they remain substantially fixed with respect to each other. Each frame 432 is provided with a downwardly opening threaded sleeve 436.

Directly below rod 142, a stud 440 is threadably received within sleeve 436 and is secured to frame 422 so that the vertical spacing of frame 422 with respect to the frame 432 is relatively fixed.

Referring now to the mechanism below rod 144, sleeve 442 is threadably received within sleeve 436 and a gear 444 is fixedly secured onto sleeve 442. A stud 446 is threaded into the sleeve 442 so that rotation of sleeve 442 by gear 444, not only moves sleeve 442 with respect to sleeve 436, but also, moves stud 446 in an opposite direction with respect to sleeve 442. Consequently rotation of gear 444 changes the vertical position of frame 420 and, thus, changes the transverse angle of working roll 130 with respect to strip B.

Although the gear 444 or sleeve 442 may be moved manually, in accordance with the illustrated embodiment of the invention, there is provided a gear 450 driven by motor 452 fastened onto a plate 454 on frame 420. Feelers 460, 462 positioned on opposite sides of strip B actuate sensing devices 464, 466, respectively, when the strip B moves transversely a predetermined amount. Sensing devices 464, 466 are electrically connected by lines 470, 472 with motor 452.

In operation, as the strip B walks transversely on roll 130 the feeler on the side toward which the strip walks is actuated. The actuated feeler then energizes one of the sensing devices to cause rotation of motor 452. In this manner, the angle of roll 130 is properly altered so that the strip B moves transversely from the actuated feeler.

It is appreciated that an adjusting arrangement could be provided on both rod 142 and 144 without departing from the intended spirit and scope of the present invention, although in practice, adjustment of the frame 420 below rod 144 has been found to be satisfactory.

In accordance with the illustrated embodiment of the invention, a scale 480 is connected onto frame 432 and a pointer 482 is connected onto frame 420, see FIGURE 11. This scale and pointer indicates the amount of angular disposition of roll 130. This arrangement is more beneficial when sleeve 442 is being manually adjusted to change the angle of rolls 130, 132.

Referring now to working station 304, the pinch roll set 306 includes a lower, small diameter working roll 500, a large diameter back-up roll 502 and an upper pressure roll 504 bearing downwardly toward the small diameter working roll 500. Pressure is exerted on roll 504 by transversely spaced power cylinders 74, 76, similar in operation to the like power cylinders of apparatus A. The pinch roll set 308 includes roll 510, 512 with cylinders 84, 86 forcing the upper pressure roll 510 toward the lower roll 512. Both sets of pressure rolls 306, 308 are driven by appropriate drive shafts 514, 516 connected to the output of gear reducer 408, as best shown in FIGURE 10. The leveler 310 is basically the same as leveler 28 in apparatus A; therefore, further description of this feature of apparatus E is not required.

The cold working of strip B requires a small diameter working roll 500; therefore, for proper strength, it is necessary to provide a large diameter back-up roll 502. The roll 502 is offset horizontally from roll 500 because the component of force exerted by the strip B and by the pressure roll 504 is not directly downwardly. The operation of the third working station 304 and the leveler 310 is well appreciated by anyone skilled in the art of processing uncoilers to which the present invention is directed.

Referring now to another aspect of the present invention, the pinch rolls 390, 392 at station 300 and the pinch roll sets 306, 308 of station 304 are each provided with a spring back-up mechanism 520 between the power cylinder and the upper pressure roll of each pinch roll set. Since each of these spring back-up mechanisms are substantially identical, only the mechanism associated with the first working station 300 and pinch rolls 390, 392 will be described and this description will apply equally to all mechanisms 520.

Mechanism 520, see FIGURE 14, includes a ram 522 extending downwardly from each of the power cylinders 400. The ram 522 includes a flange 524 cooperatively associated with schematically represented stop 526. The stop limits the lowermost position of ram 522 when it is exerting pressure downwardly against the frame 396 of the upper roll 392. Flange 524 terminates in a downwardly extending nipple 528 having a threaded aperture 530. Below the nipple 528 there is provided a housing 532 having an upper flanged plate 534 secured onto the housing 532 by a plurality of bolts 536. The plate 534 is provided with an appropriate aperture 538 having diametrically spaced flat surfaces, the function of which will be hereinafter described.

The lower portion of housing 532 is provided with a sleeve 540 and through the housing there extends a shaft 542 having an upper threaded stud 544, a shank 546 with flat sides 548 which shank is received within aperture 538 so that it will not rotate with respect to the housing, a flange 550 reciprocally received within aperture 552 in the upper portion of the housing, a lower threaded stud 554 and a bearing shank 556 rotatably received within a plan bearing 558. Within a housing 532 there is also provided a bearing sleeve 560 having an upper bearing surface 562 and a lower bearing surface 564. The upper bearing surface contacts the lower end of gear ring 566 which is threadably received upon stud 554. A worm gear 568 engages gear ring 566 and is rotated by a shaft 570 operated through a hand wheel 572 positioned on one side of apparatus E. The shaft 570 extends across the apparatus to drive a similar worm gear 568 on the opposite spring back-up mechanism 20.

Housing 532 includes a downwardly extending flange 580 which is connected by bolts 582 onto frame 396 of pressure role 392. Within frame 396 there is provided a spring recess 584 which receives a coil compression spring 590 bearing against the lower surface of recess 584 and against the lower bearing surface 564 of sleeve 560.

In operation, the compression of spring 590 is controlled by rotating worm 568. In this manner, gear ring 566 and sleeve 560 are moved in a vertical direction to change the amount of compression of spring 590. Since the ram 522 can move downwardly a given amount determined by stop 526, the increase in compression of spring 590 determines the amount of force exerted by roll 392 against the roll 390. The spring 590 allows roll 392 to spring upwardly as the strip B moves therethrough, especially as the leading end of the strip passes between the rolls. This upward movement of roll 392 will not be as free if the ram 522 were in direct contact with frame 396 of roll 392. With such a direct connection, upward movement of the roll 392 would require upward movement of ram 522 against fluid within the cylinder 400.

It is common knowledge that the fluid within cylinder 400 will resist rapid movement of ram 522 because of the inability of the fluid backing the ram to be rapidly displaced. Consequently, the spring 590 allows a rapid separation of the pinch rolls when the leading edge of the strip passes between the rolls. Also, these mechanisms allow for variation in the thickness of the strip as the strip is passing through the apparatus. This is a substantial advance over known pinch roll constructions wherein hydraulic or mechanical force is directly exerted against the upper pressure roll. To indicate the amount of compression of spring 590, in accordance with the illustrated embodiment of the invention, a scale 592 (FIGURE 11) is positioned on frame 396 and a pointer 594 is operably associated with sleeve 560 so that the pointer indicates on the scale the amount of displacement of sleeve 560 and the compression of the spring 590.

The present invention has been described in connection with certain structural embodiments; however, it is appreciated that various structural changes may be made in these embodiments without departing from the intended spirit and scope of the present invention as defined in the appended claims.

Having thus described my invention, I claim:

1. An apparatus for uncoiling and processing a metal strip comprising, in combination, a mandrel mounted to rotate about an axis and adapted to support a coil of said strip, a set of pinch rolls for processing said strip and spaced from said mandrel, a first working roll between said pinch rolls and said mandrel and defining a horizontal pass for said strip, and a second working roll between said first working roll and said pinch rolls, said second working roll being positioned substantially below said horizontal pass to define a sinuous path for said strip coming from said coil, a threading apron pivotally mounted coaxially with respect to said first working roll and means for rotating said apron from an inactive position below said first working roll to a threading position generally aligned with said horizontal pass.

2. An apparatus as defined in claim 1 including a means between said first working roll and said mandrel for peeling the leading edge of such strip from said coil, and means for shifting said peeler means into peeling engagement with said coil.

3. An apparatus as defined in claim 2 wherein said peeler means and said apron are movable in intersecting paths so that movement of said peeler means into peeling position causes movement of said apron from the inactive position to the strip threading position.

4. An apparatus for uncoiling and processing a metal strip comprising, in combination, a mandrel mounted to rotate about an axis and adapted to support a coil of said strip, a set of pinch rolls for processing said strip and spaced from said mandrel, a first working coil between said pinch rolls and said mandrel and defining a horizontal pass for said strip, and a second working roll between said first working roll and said pinch rolls, said second working roll being positioned substantially below said horizontal pass to define a sinuous path for said strip coming from said coil, a means between said first roll and said mandrel for peeling the leading edge of such strip from said coil, and means for shifting said peeler means into peeling engagement with said coil.

5. In an apparatus for uncoiling and processing a metal strip comprising, in combination, a horizontally extending mandrel, a pair of pinch rolls defining a pass spaced outwardly from the axis of rotation of said mandrel, and first processing roll means disposed horizontally between said mandrel and said pinch rolls cooperating directly therewith to define a sinuous path for the strip payed from a coil on said mandrel, the improvement comprising: another processing roll means between said mandrel and said first processing roll mean and defining a generally V-shaped sinuous path including said two processing roll means and said pinch rolls.

6. In an apparatus for uncoiling and processing a metal strip comprising, in combination, a mandrel mounted to rotate about an axis and adapted to support a coil of said strip, a working roll means spaced horizontally from said mandrel, a peeler means between said working roll means and said coil and having a head, guide means, said peeler means being supported in said guide means, means for moving said head in a longitudinal direction with respect to said guide means and means for pivoting said guide means.

7. A combination as defined in claim 6 including a threading apron pivotally mounted coaxially with respect to said working roll means and means for rotating said apron from an inactive position below said working roll to a threading position generally longitudinal with respect to said apparatus, said peeler means and said apron being movable in intersecting paths so that movement of said peeler means into peeling position causes movement of said apron from the inactive position to the strip threading position.

8. An apparatus for feeding the leading end of a coil of metal strip into a processing line comprising, in combination with an uncoiler for supporting and rotating said coil, a peeler mounted generally between said coil and said processing line, means for moving said peeler into peeling position with said coil, a threading apron between said processing line and said coil and adapted to be moved between an inactive and an active position and means on said peeler for moving said apron into active position as said peeler is moved into its peeling position.

9. An apparatus as defined in claim 8 wherein said means on said peeler comprises a first cam surface, said apron having a second cam surface, said surfaces being so positioned that movement of said peeler into peeling position causes said first cam surface to contact said second cam surface and raise said apron into its threading position.

10. An apparatus as defined in claim 9 wherein said processing line includes a first processing roll means and means for pivotally mounting said threading apron coaxially with respect to said first roll means.

11. An apparatus as defined in claim 10 wherein said processing line further includes a second processing roll means and a set of pinch rolls, said first roll means and the nip of said pinch rolls defining a horizontal pass and said second processing roll means being positioned between said first roll means and said pinch rolls and generally below said horizontal pass.

12. An apparatus as defined in claim 8 wherein said processing line includes a first processing roll means and means for pivotally mounting said threading apron coaxially with respect to said roll means.

13. An apparatus as defined in claim 8 wherein said processing line includes a first roll means, a second roll means and a set of pinch rolls, said first roll means and the nip of said pinch rolls defining a horizontal pass and said second roll means being positioned between said first roll means and said pinch rolls and generally below said horizontal pass.

14. An apparatus as defined in claim 8 including a driven friction roll and means for forcing said driven roll into driving engagement with said coil.

15. An apparatus for feeding the leading end of a coil of metal strip into a processing line comprising, in combination with an uncoiler for supporting and rotating said coil, a working roll mounted to rotate on an axis substantially parallel to the axis of said coil and at the entrant end of said processing line, a threading apron extending radially outwardly from said roll and pivotally mounted on the axis of said roll, and means for pivoting said apron between an inactive downward position and a strip threading horizontal position, a peeler between said coil and said working roll, means for moving said peeler into peeling engagement with said coil and said first-mentioned means being carried by said peeler.

16. A processing uncoiler as defined in claim 15 wherein said means carried on said peeler comprises a first cam surface, said apron having a second cam surface, said surfaces being so positioned that movement of said peeler into the peeling position causes said first cam surface to contact said second cam surface and raise said apron into its threading position.

17. An apparatus for uncoiling and processing a metal strip comprising, in combination, a mandrel mounted to rotate about an axis and adapted to support a coil of said strip, a first set of pinch rolls for processing said strip and spaced from said mandrel, a first working roll between said first set of pinch rolls and said mandrel and defining a horizontal pass for said strip, a second working roll between said first working roll and said first set of pinch rolls, said second working roll being positioned substantially below said horizontal pass to define a sinuous path for said strip coming from said coil, a pinch roll above said first working roll and forming therewith a second set of pinch rolls whereby said second working roll may work said strip after the trailing end has left the mandrel and until said trailing end passes said second set of pinch rolls.

18. An apparatus as defined in claim 17 including means for driving said second set of pinch rolls.

19. An apparatus as defined in claim 17 including means for selectively shifting said second working roll into an upper strip threading position above said horizontal pass.

20. An apparatus as defined in claim 19 including means for adjusting said second working roll into a selected position substantially below said horizontal pass.

21. An apparatus for uncoiling and processing a metal strip comprising, in combination, a mandrel mounted to rotate about an axis and adapted to support a coil of said strip, a set of pinch rolls for processing said strip and spaced from said mandrel, a first working roll between said set of pinch rolls and said mandrel and defining a horizontal pass for said strip, a second working roll between said first working roll and said set of pinch rolls and said second working roll being positioned substantially below said horizontal pass to define a sinuous path for said strip coming from said coil, said set of pinch rolls including a large diameter upper roll adapted to bear downwardly against said strip, a small diameter lower roll adapted to bear upwardly against said strip, and a large diameter back-up roll below said lower roll and bearing upwardly thereagainst whereby the small diameter lower roll and first and second working rolls determine the amount of cold working of said strip as it passes through said apparatus.

22. An apparatus for uncoiling and processing a metal strip comprising, in combination, a mandrel mounted to rotate about an axis and adapted to support a coil of said strip, a set of pinch rolls for processing said strip and spaced from said mandrel, a first working roll between said set of pinch rolls and said mandrel and defining a horizontal pass for said strip, a second working roll between said first working roll and said set of pinch rolls, said second working roll being positioned substantially below said horizontal pass to define a sinuous path for said strip coming from said coil, and means for skewing said second working roll laterally with respect to said horizontal pass to track said strip as it passes through said apparatus.

23. An apparatus as defined in claim 22 wherein said skewing means includes a device for sensing transverse displacement of said strip in said apparatus, and motor means controlled by said sensing means for skewing said second working roll when said strip exceeds a predetermined amount of transverse displacement.

24. An apparatus for uncoiling and processing a metal strip comprising, in combination, a mandrel mounted to rotate about an axis and adapted to support a coil of said strip, a set of pinch rolls for processing said strip and spaced from said mandrel, a first working roll between said set of pinch rolls and said mandrel and defining a horizontal pass for said strip, a second working roll between said first working roll and said set of pinch rolls, said second working roll being positioned substantially below said horizontal pass to define a sinuous path for said strip coming from said coil, said second working roll being mounted on vertically extending elements at opposite sides of said horizontal pass, and means for changing the vertical position of at least one of said elements to track said strip as it passes through said apparatus.

25. An apparatus as defined in claim 23 wherein said vertically adjustable element includes an upper member fixedly connected onto said apparatus, a lower member fixedly secured onto said second working roll and adjusting means between said members to change the vertical position of said second member with respect to said first member.

26. An apparatus for uncoiling and processing a metal strip comprising, in combination, a mandrel mounted to rotate about an axis and adapted to support a coil of said strip, a set of pinch rolls for processing said strip and spaced from said mandrel, a first working roll between said set of pinch rolls and said mandrel and defining a horizontal pass for said strip, a second working roll between said first working roll and said set of pinch rolls and said second working roll being positioned substantially below said horizontal pass to define a sinuous path for said strip coming from said coil, said set of pinch rolls comprising a first generally fixed roll bearing against said strip from one side and a second movable roll bearing against the opposite side of said strip, said rolls being aligned on opposite sides of said strip and a ram for forcing said second roll toward said first roll, said ram being connected to said second roll by a compression spring member.

27. An apparatus as defined in claim 26 wherein said ram is connected onto a fluid operated motor means, said motor means forcing said second roll toward said first roll and said motor means having a preselected stroke to limit movement which it can impart to said second roll.

28. An apparatus as defined in claim 27 including means for changing the amount of compression of said spring means independent of the stroke of said motor means.

References Cited

UNITED STATES PATENTS

| | | | |
|---|---|---|---|
| 3,187,530 | 6/1965 | Ranney | 72—183 X |
| 2,683,570 | 7/1954 | Ferm | 242—78.8 |
| 2,262,118 | 11/1941 | Sieger | 242—78.8 |
| 899,492 | 9/1908 | Leonard | 226—187 |
| 1,700,736 | 2/1929 | Brenan | 226—187 |
| 1,862,626 | 6/1932 | Lindh | 242—78.2 |
| 2,177,577 | 10/1939 | Mikaelson | 242—78.6 |
| 2,485,961 | 10/1949 | Duby | 242—79 |
| 2,877,821 | 3/1959 | Potter | 242—78.2 X |

NATHAN L. MINTZ, Primary Examiner

U.S. Cl. X.R.

242—78.8